United States Patent
Henry

(12) United States Patent (10) Patent No.: US 7,597,403 B1
Henry (45) Date of Patent: Oct. 6, 2009

(54) RIM PROTECTION APPARATUS FOR TIRES

(76) Inventor: Ricky Henry, 11708 Genn Cir., Plainfield, IL (US) 60544

( * ) Notice: Subject to any disclaimer, the term of this patent is extended or adjusted under 35 U.S.C. 154(b) by 160 days.

(21) Appl. No.: 11/804,902

(22) Filed: May 21, 2007

Related U.S. Application Data

(63) Continuation-in-part of application No. 10/295,421, filed on Nov. 15, 2002, now abandoned.

(60) Provisional application No. 60/343,533, filed on Dec. 31, 2001.

(51) Int. Cl.
*B60B 7/02* (2006.01)

(52) U.S. Cl. .............................. 301/37.103; 301/37.104

(58) Field of Classification Search ............ 301/37.101, 301/37.103, 37.104; 118/505; D12/204, D12/213
See application file for complete search history.

(56) References Cited

U.S. PATENT DOCUMENTS

| | | | | |
|---|---|---|---|---|
| 4,407,426 A * | 10/1983 | McLaren et al. | ............ | 220/781 |
| 4,874,206 A * | 10/1989 | Sampson | ............... | 301/37.103 |
| 6,227,623 B1 * | 5/2001 | Bellow | ..................... | 301/37.42 |
| 6,692,085 B1 * | 2/2004 | Threadgill | ............. | 301/37.103 |
| 6,828,008 B2 * | 12/2004 | Gruber | ........................ | 428/192 |
| 6,871,914 B2 * | 3/2005 | Stewart, Jr. | ............ | 301/37.104 |
| 7,051,871 B2 * | 5/2006 | Loritz | ..................... | 206/308.1 |
| 7,374,248 B1 * | 5/2008 | Clayton | ................. | 301/37.103 |
| 2007/0085412 A1 * | 4/2007 | Saulnier | ................ | 301/37.103 |

\* cited by examiner

*Primary Examiner*—Russell D Stormer

(57) ABSTRACT

A rim protection apparatus for protecting rims while cleaning and dressing tires is provided. The rim protection apparatus comprises a plurality of rim covering discs with each rim covering disc having a first side surface and a second side surface and each rim covering disc having a diameter greater than or less than any other rim covering disc. A hub handle is positioned in the approximate center of a rim covering disc having the smallest diameter with the hub handle being sized and shaped for being graspable by a user. A disc attachment mechanism releasably secures each of the rim covering discs to an adjacent rim covering disc. An absorbent material is secured around a perimeter of the second side surface of each of the rim covering discs with the absorbent material absorbing cleaning solutions and dressings.

8 Claims, 3 Drawing Sheets

RIM PROTECTION APPARATUS FOR TIRES

The present application is a continuation-in-part of patent application Ser. No. 10/295,421, filed on Nov. 15, 2002, now abandoned entitled "Hub Handle" which claims priority of provisional patent application Ser. No. 60/343,533, filed on Dec. 31, 2001.

BACKGROUND OF THE INVENTION

1. Field of the Invention

This invention relates generally to a rim protection apparatus for tires and, more particularly, the invention relates to a rim protection apparatus for tires which protects the rims from being tarnished while cleaning or dressing tires.

2. Description of the Prior Art

Most motorists love the feeling of comfort, convenience, mobility, and independence they get from owning their own car or truck. Most motorists also take pride in the appearance of their vehicle and regularly wash and wax it to maintain the luster. Many motorists also use various types of cleaning solutions and dressings to improve the appearance of upholstery and tires. A problem that is associated with applying many of these solutions and dressings to tires is having to wipe rims clean from the over spray whenever a tire dressing or cleaning solution has been applied to the tires. Many individuals do try to keep their tires clean and good looking in appearance and it is inevitable that some of the tire dressing or cleaning solution used will end up on the rims.

SUMMARY

The present invention is a rim protection apparatus for protecting rims while cleaning and dressing tires. The rim protection apparatus comprises a plurality of rim covering discs with each rim covering disc having a first side surface and a second side surface and each rim covering disc having a diameter greater than or less than any other rim covering disc. A hub handle is positioned in the approximate center of a rim covering disc having the smallest diameter with the hub handle being sized and shaped for being graspable by a user. A disc attachment mechanism releasably secures each of the rim covering discs to an adjacent rim covering disc. An absorbent material is secured around a perimeter of the second side surface of each of the rim covering discs with the absorbent material absorbing cleaning solutions and dressings.

In addition, the present invention includes a rim protection apparatus for protecting rims while cleaning and dressing tires. The rim protection apparatus comprises a hub handle disc having a first side surface and a second side surface, a first disc having a first side surface and a second side surface with the first disc having a diameter greater than a diameter of the hub handle disc, a second disc having a first side surface and a second side surface with the second disc having a diameter greater than the diameter of the first disc, a third disc having a first side surface and a second side surface with the third disc having a diameter greater than the diameter of the second disc, a fourth disc having a first side surface and a second side surface with the fourth disc having a diameter greater than the diameter of the third disc. A hub handle is positioned in the approximate center of the hub handle disc with the hub handle being sized and shaped for being graspable by a user. A disc attachment mechanism releasably secures the second side surface of the hub handle to each of the first disc, the second disc, the third disc, and the fourth disc, releasably secures the second side surface of the first disc to the first side surface of the second disc, releasably secures the second side surface of the second disc to the first side surface of the third disc, and releasably secures the second side surface of the third disc to the first side surface of the fourth disc. An absorbent material is secured around a perimeter of the second side surface of each of the discs, the absorbent material absorbing cleaning solutions and dressings.

The present invention further includes a method for protecting rims while cleaning and dressing tires. The method comprises providing a plurality of rim covering discs with each rim covering disc having a first side surface and a second side surface and each rim covering disc having a diameter greater than or less than any other rim covering disc, positioning a hub handle in the approximate center of a rim covering disc having the smallest diameter with the hub handle being sized and shaped for being graspable by a user, releasably securing each of the rim covering discs to an adjacent rim covering disc, and securing an absorbent material around a perimeter of the second side surface of each of the rim covering discs, the absorbent material absorbing cleaning solutions and dressings.

DETAILED DESCRIPTION OF THE PREFERRED EMBODIMENTS

Figure 1:
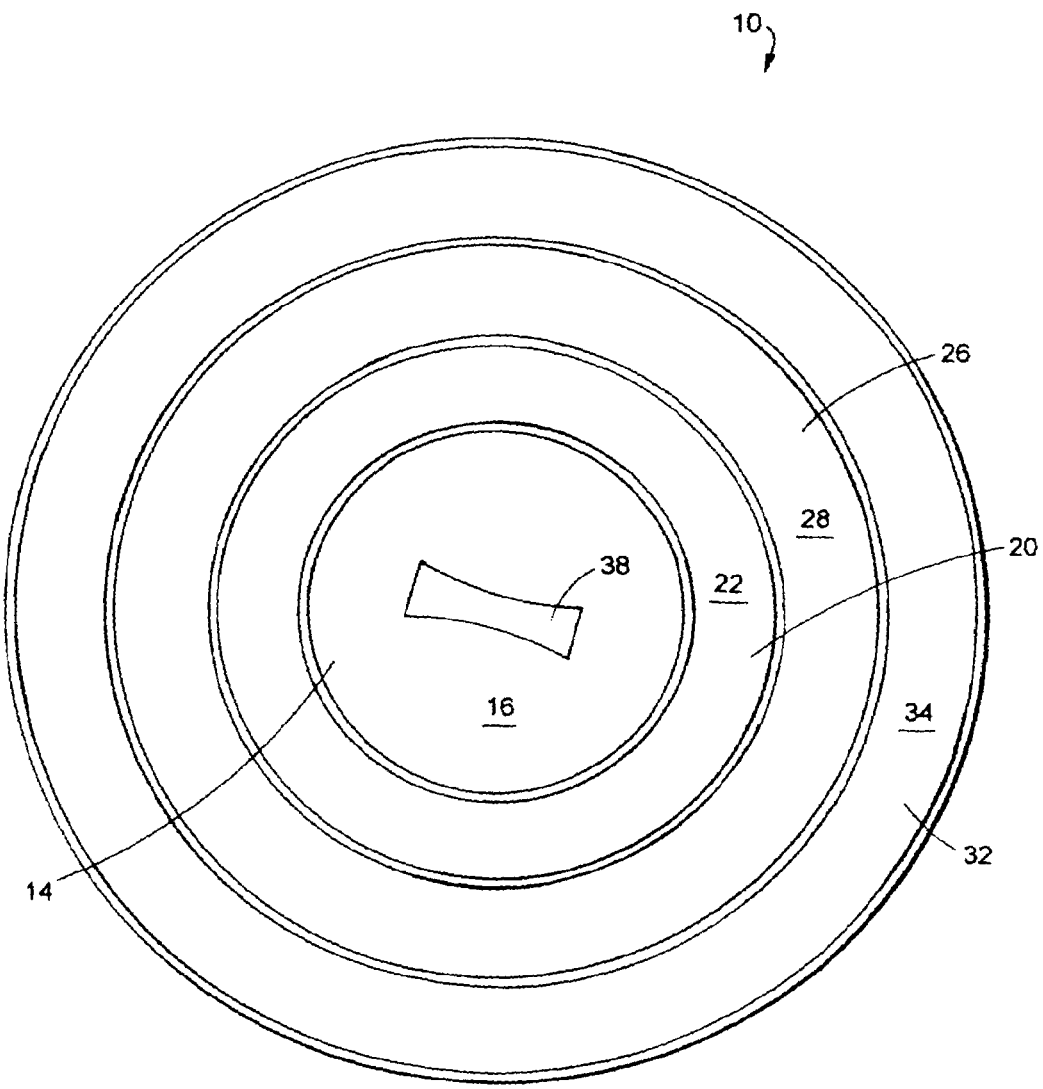
FIG. 1 is a top plan view illustrating a rim protection apparatus for tires, constructed in accordance with the present invention.
Figure 2:
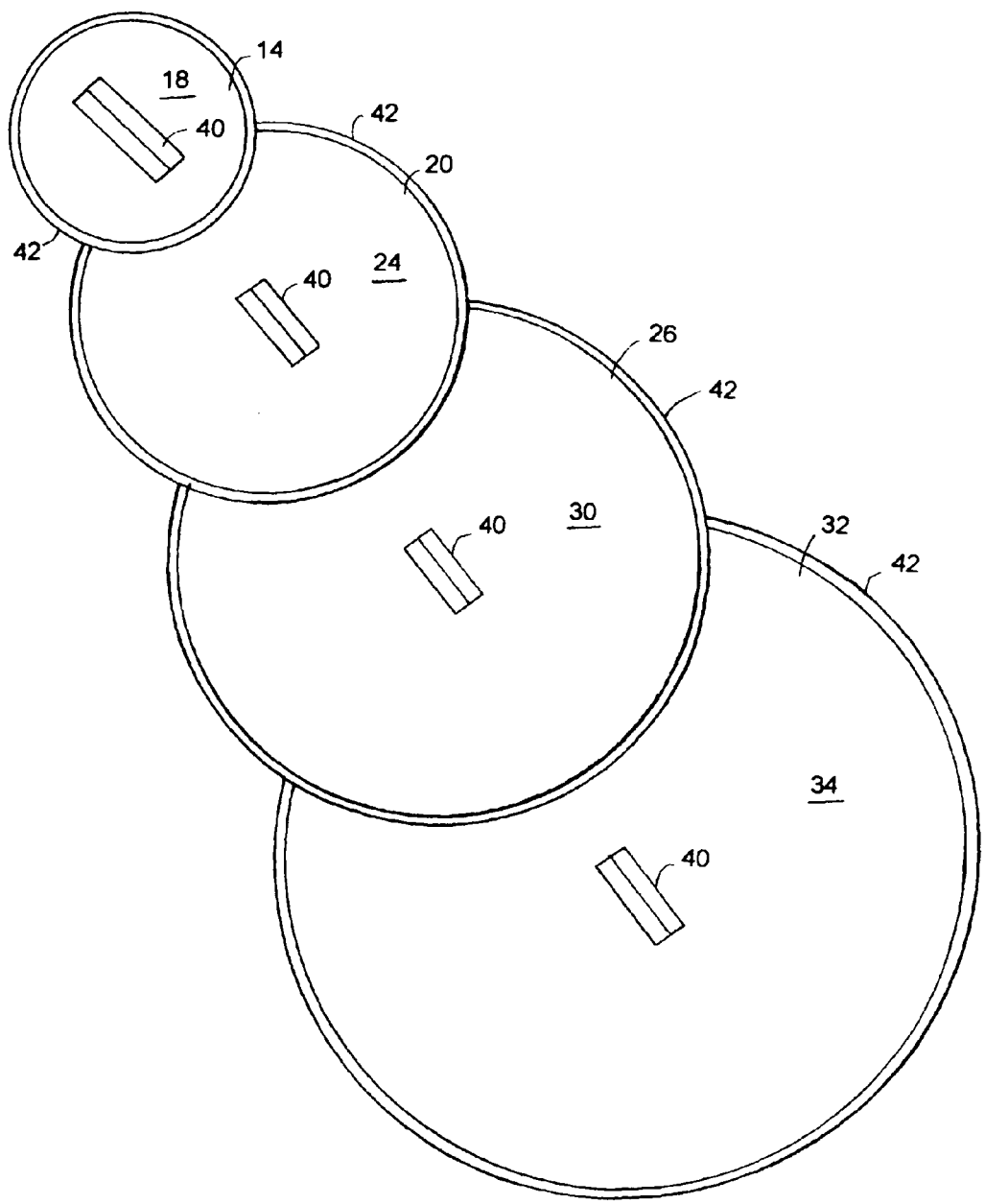
FIG. 2 is a bottom plan view illustrating the rim protection apparatus for tires, constructed in accordance with the present invention.
Figure 3:
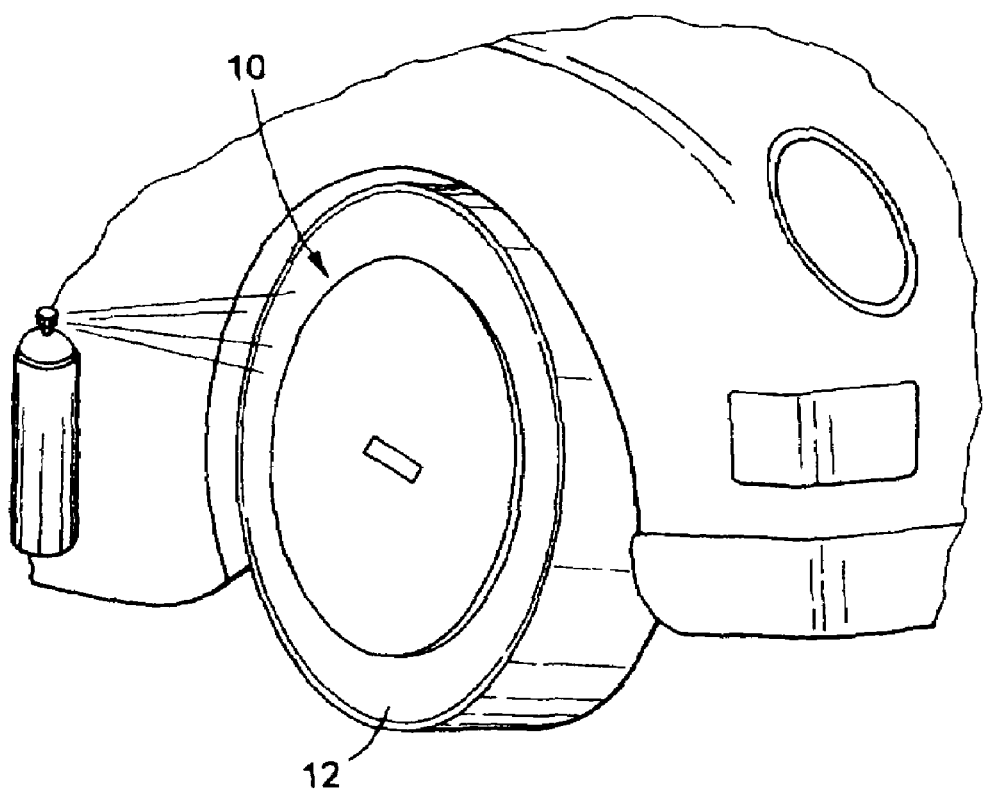
FIG. 3 is a perspective view illustrating the rim protection apparatus for tires, constructed in accordance with the present invention, with the rim protection apparatus in use.

As illustrated in FIGS. 1-3, the present invention is a rim protection apparatus, indicated generally at 10, for tires 12. The rim protection apparatus 10 of the present invention makes it convenient and possible to protect rims from being tarnished while cleaning or dressing tires 12.

The rim protection apparatus 10 of the present invention includes a plurality of rim covering discs each having a first side surface and a second side surface. The plurality of rim covering discs include a substantially circular hub handle disc 14 having a first side surface 16, a second side surface 18, and a diameter of approximately sixteen (16") inches, a substantially circular first disc 20 having a first side surface 22, a second side surface 24, and a diameter of approximately eighteen (18") inches, a substantially circular second disc 26 having a first side surface 28, a second side surface 30, and a diameter of approximately twenty (20") inches, and a substantially circular third disc 32 having a first side surface 34, a second side surface 36, and a diameter of approximately twenty-two (22") inches. Additional rim covering discs, such as a substantially circular fourth disc (not shown) having a diameter of approximately twenty-four (24") inches, can also be added. It should be noted that while particular diameters are herein presented for the plurality of rim covering discs, a person skilled in the art will understand that rim covering discs having greater diameters or lesser diameters are within the scope of the present invention. In addition, preferably the plurality of rim covering discs are constructed from any type of durable material including, but not limited to, metal, wood, plastic, etc.

The hub handle disc of the rim protection apparatus 10 of the present invention includes a hub handle 38 positioned in the approximate center of the first side surface 16 of the hub handle disc 14. The hub handle 38 allows a user to effectively grasp the hub handle 38 and position the rim protection apparatus 10 over a rim area of the tire 12. The hub handle 38 is preferably constructed of any durable material including, but not limited to, metal, wood, plastic, etc.

The rim protection apparatus 10 of the present invention further includes a disc attachment mechanism 40 for releasably securing the hub handle disc 14 to any of the plurality of rim covering discs 20, 26, 30, the first disc 20 to the second disc 26, the second disc 26 to the third disc 32, and the third disc 32 to the fourth disc, if provided. Preferably, the disc attachment mechanism 40 comprises Velcro or hook and loop fastener with a complementary hook and loop fastener on the second side surface 18 of the hub handle disc 14 and the first side surface 22 of the first disc 20, a complementary hook and loop fastener on the second side surface 24 of the first disc 20 and the first side surface 28 of the second disc 26, a complementary hook and loop fastener on the second side surface 30 of the second disc 26 and the first side surface 34 of the third disc 32, and a complementary hook and loop fastener of the second side surface 34 of the third disc 32 and the first side surface of the fourth disc. It should be noted that the hub handle disc 14 can be releasably secured to either the first disc 22, the second disc 26, the third disc 32, or the fourth disc, depending on the desires of the user.

Furthermore, each of the plurality of rim covering discs of the rim protection apparatus 10 of the present invention includes an absorbent material 42 secured around the perimeter of the second side surface of each of the rim covering discs. During use, the absorbent material 42 absorbs cleaning solutions and dressings inhibiting the rims from becoming inadvertently coated with these substances and inhibiting leaking between the tire 12 and the rim, as will be explained in further detail below.

The manner of use of the rim protection apparatus 10 of the present invention will now be described. It will be understood by those skilled in the art that the manner of use of the rim protection apparatus 10 described herein is merely one method of use and other methods of use of the rim protection apparatus 10 are within the scope of the present invention.

Use of the rim protection apparatus 10 of the present invention is very simple and straightforward. Prior to applying a dressing or cleaning solution to the tire 12, the user selects the rim covering disc which best approximates the diameter of the rim. The selected rim covering disc is then removed from the remaining rim covering discs and the hub handle disc 14 is releasably secured to the first side surface of the selected rim covering disc. The hub handle 38 on the hub handle disc 14 is gripped and the selected rim covering disc is positioned over the rim of the tire 12 to be cleaned or dressed. While holding the selected rim covering disc over the rim, cleaning solutions and/or dressings can be applied to the tire 12 and the tire 12 wiped down with a cloth or rag, without any danger of any of the dressing or cleaning product inadvertently transferred onto the rim.

After completion, the selected rim covering disc of the rim protection apparatus 10 of the present invention is then removed from over the rim and, if necessary, the absorbent material 42 is cleaned. Then, the hub handle disc 14 is removed with the selected rim covering disc being resecured to the remaining rim covering discs and the hub handle disc 14 for storage. The rim protection apparatus 10 is now ready and available for use again and again.

It should be noted that the hub handle disc 14 of the rim protection apparatus 10 of the present invention can be used, by itself, to cover the rims. The method described above would still apply.

After completion, there is no requirement to clean the rims of any over spray. With the rim protection apparatus 10 of the present invention, the rims are protected thereby saving considerable time and labor whenever tires have to be cleaned or tire dressing applied to them.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A rim protection apparatus for protecting rims while cleaning and dressing tires, the rim protection apparatus comprising:
    a hub handle disc having a first side surface and a second side surface;
    a first disc having a first side surface and a second side surface, the first disc having a diameter greater than a diameter of the hub handle disc;
    a second disc having a first side surface and a second side surface, the second disc having a diameter greater than the diameter of the first disc;
    a third disc having a first side surface and a second side surface, the third disc having a diameter greater than the diameter of the second disc;
    a hub handle positioned in the approximate center of the hub handle disc, the hub handle being sized and shaped for being graspable by a user;
    a disc attachment means for releasably securing the second side surface of the hub handle disc to each of the first disc, the second disc, the third disc, and the fourth disc, and for releasably securing the second side surface of the first disc to the first side surface of the second disc, for releasably securing the second side surface of the second disc to the first side surface of the third disc, and for releasably securing the second side surface of the third disc to the first side surface of the fourth disc; and
    an absorbent material secured around a perimeter of the second side surface of each of the discs, the absorbent material absorbing cleaning solutions and dressings.

2. The rim protection apparatus of claim 1 wherein each of the discs is substantially circular.

3. The rim protection device of claim 1 wherein the hub handle disc has a diameter of approximately sixteen (16") inches, the first disc has a diameter of approximately eighteen (18") inches, the second disc has a diameter of approximately twenty (20") inches, and the third disc has a diameter of approximately twenty-two (22") inches.

4. The rim protection device of claim 1 wherein the plurality of rim covering discs are constructed from a plastic material.

5. The rim protection apparatus of claim 1 wherein the disc attachment mechanism comprises hook and loop fasteners.

6. The rim protection apparatus of claim 5 wherein a hook portion is secured to the first side surface of each of the discs and a loop portion is secured to the second side surface of each of the discs.

7. The rim protection apparatus of claim 5 wherein a loop portion is secured to the first side surface of each of the discs and a hook portion is secured to the second side surface of each of the discs.

8. The rim protection apparatus of claim 1 wherein the hub handle is selected from the group consisting of metal, wood, and plastic.

* * * * *